United States Patent [19]

Cheng

[11] Patent Number: 4,793,725
[45] Date of Patent: Dec. 27, 1988

[54] PHOTO CLAMP JOINT

[76] Inventor: Huo-Ching Cheng, 49, Lane 410, Chen Shing Rd., Taichung, Taiwan

[21] Appl. No.: 41,117

[22] Filed: Apr. 22, 1987

[51] Int. Cl.$^4$ .............................................. F16D 1/00
[52] U.S. Cl. .................................. 403/174; 403/170; 446/111
[58] Field of Search ...................... 403/174, 178, 170; 446/111, 115

[56] References Cited

U.S. PATENT DOCUMENTS

| | | | |
|---|---|---|---|
| 3,855,748 | 12/1974 | Thomas | 446/115 X |
| 4,054,393 | 10/1977 | Talleri | 403/174 |
| 4,515,280 | 5/1985 | Sheu | 403/170 X |
| 4,571,200 | 2/1986 | Serna | 446/111 X |

FOREIGN PATENT DOCUMENTS 48892 4/1982 European Pat. Off. ............ 403/170

Primary Examiner—Andrew V. Kundrat
Attorney, Agent, or Firm—Holman & Stern

[57] ABSTRACT

The invention is a photo clamp joint which can display photographs in various flat or three-dimensional displays, the device is composed of two four leaf clover shaped pieces having crossed small semi-circular protrusions to clamp photos or other paper materials in series to form different shapes for the purpose of creating a display.

5 Claims, 4 Drawing Sheets

PHOTO CLAMP JOINT

BACKGROUND OF THE INVENTION

1. Field of the Invention

The invention relates to a device for clamping photos into a three-dimensional display effect. More particularly, the invention is a photo clamp joint that can be connected to photos in order to hold the photos in various shapes or positions.

2. Description of the Background Art

People generally store their photos in a photo album. A photo album can not constantly display a particular photo without being opened. Most people place a favorite photo in a frame and mount the framed photo on the wall or place it on a table. Only one photo can be displayed in a frame at one time and most people do not frequently change the photo because it is time consuming to replace it.

SUMMARY OF THE INVENTION

The invention involves a unique photo clamp which provides a better display effect for one or more photos as well as a series of wooden block connectors.

A photo clamp joint of this invention consists essentially of a first planar piece and a second planar piece. Each of the planar pieces has semi circular or semi-spherical protrusions 15 raised from a plane of each planar piece. Each of the planar pieces has, in its center, an central recess 14 oriented within each of the planar pieces. Each of the planar pieces has a bottom surface. Each bottom surface has at least one raised elongated housing groove 17 and at least one raised elongated protrusion 16. The raised elongated housing groove of the first planar piece is adopted to removably receive and retain the elongated protrusion of a second. In this manner the semi-circular protrusions of the first planar pieces are aligned and paired in juxtaposition with the semi circular protrusions of the second planar pieces. This juxtaposition is such that a pair of said semi-circular protrusions removably hold a corner of a flat object such as a photo. An elongated opening 12 is formed in the edges of each arm of the cross shape planar pieces. A disc of adhesive 3 is provided for receipt in central recess 14.

The preferred embodiment of the invention relates to a device or photo clamp joint constructed by crossed semi-circular protrusions to form a shape similar to a four leaf clover. Two pieces of this shape snap together to form a joint. These semi-circular protrusions are used to clamp the photos together. By the mutual connection of photos and most clamping seats or joints, a three-dimensional curtain of photos can be connected in series. This provides a desirable display effect of the photos. Furthermore, the subject invention can provide a series of photos connected into various other shapes to achieve multiple purposes of a wooden block game or photo frames or a sheet.

DETAILED DESCRIPTION OF THE INVENTION

Figure 1:
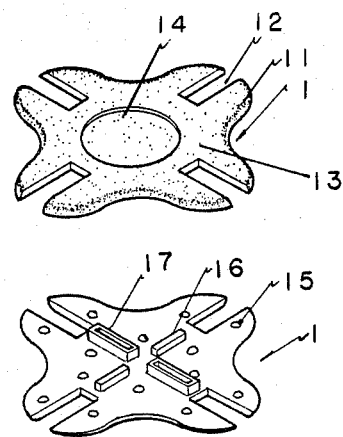
FIG. 1 shows a perspective view of the two pieces of the invention when they are separated.
Figure 2:
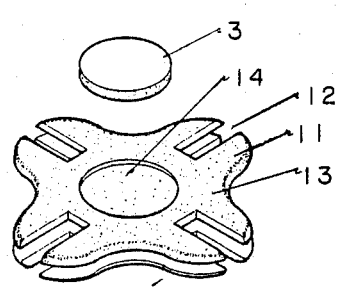
FIG. 2 shows a perspective view of the two pieces of the invention when they are joined and with a disk of adhesive.

FIGS. 1 and 2 illustrate the invention. The invention is composed of two identical pieces. A first piece has a cross shape with four arms each of which has an edge with an elongated opening. On the upper surface is an indented groove or central recess. On the lower surface are small semi-circular or semi-spherical protrusions in a crossed arrangement pattern. There are also a crossed pattern of elongated protrusion and raised elongated housing grooves which join the two-piece unit by means of the elongated protrusion and the elongated housing groove.

Figure 3:
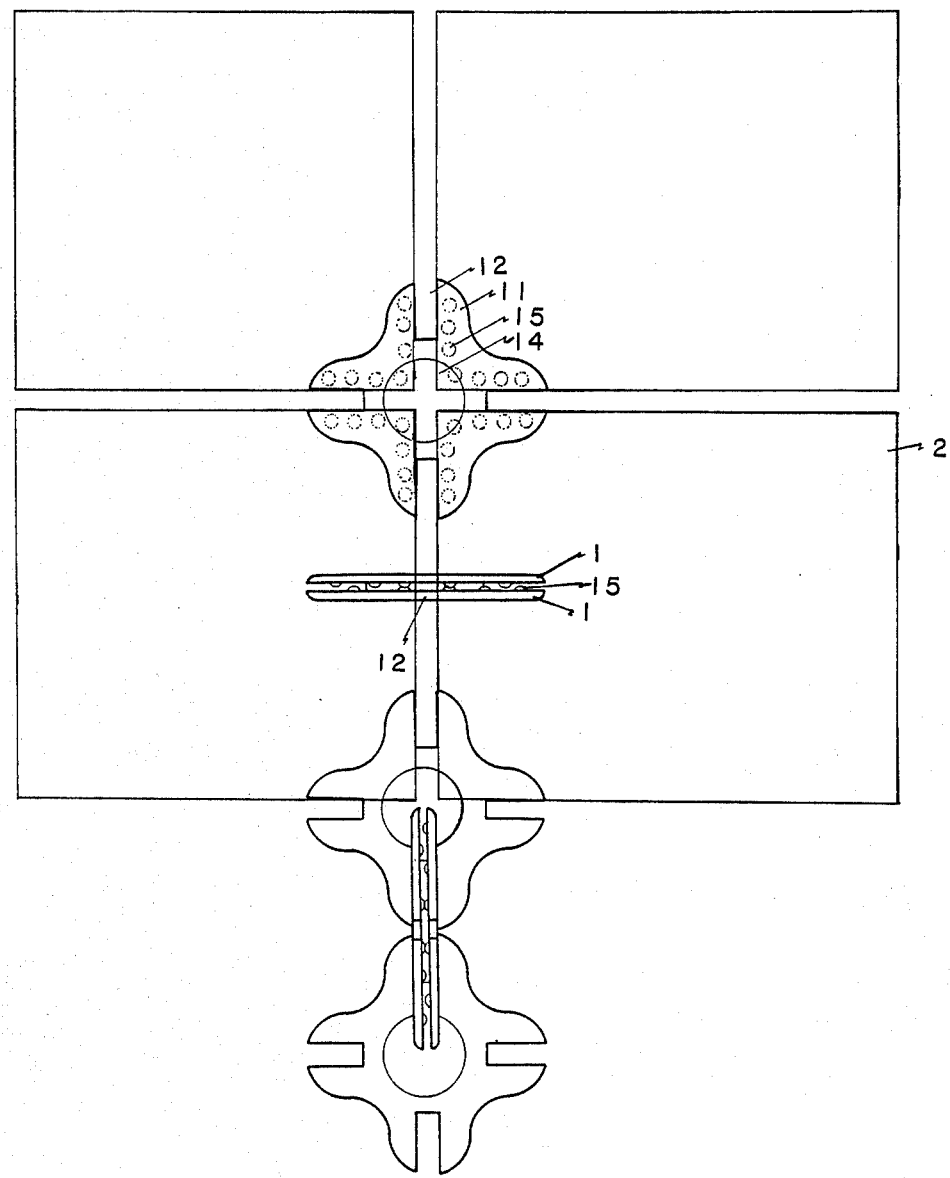
FIG. 3 shows an embodiment of the photo clamp joint.
Figure 4:
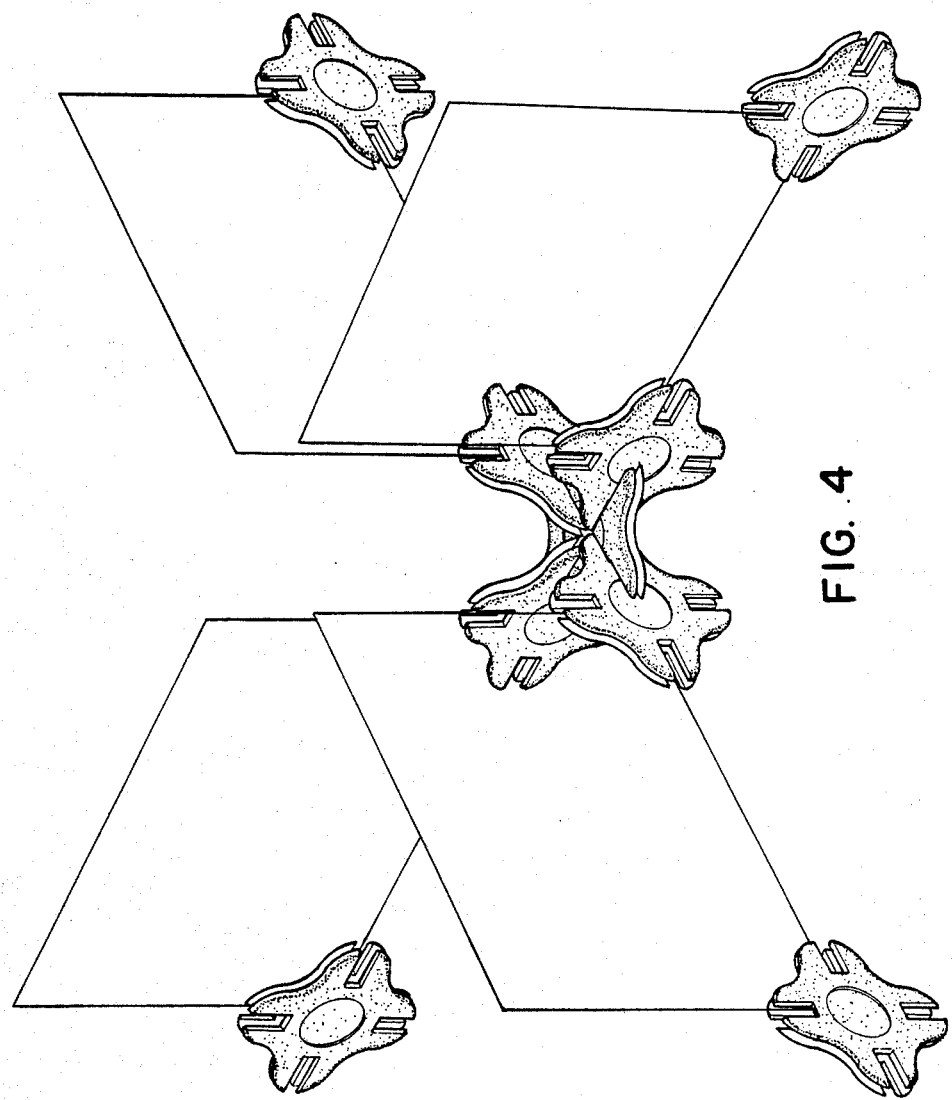
FIG. 4 shows a combination of perspective views of the photo clamp joint.
Figure 5:
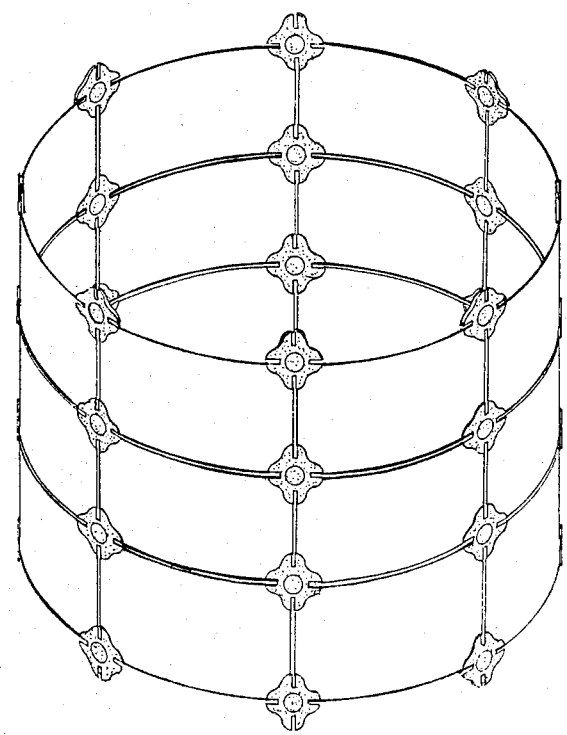
FIG. 5 shows perspective views of the photo clamp joint.

FIG. 3 illustrates a photo which can be inserted in the four corners of the subject invention. The photo is clamped by the small semi-circular protrusions arranged crosswise pattern in the two-piece unit to securely clamp the photo. Then, another clamping piece will clamp the other end of the photo and effect a series connection of photos. Thus, the photo can be displayed within a circular or arced curtain. Also the mutual clamping of the elongated opening of the invention allows for innovative clamping of photos. The use of the self-adhesive glue between the groove or central recess on the upper surface of the invention allows the invention to be put on the wall for the purpose of displaying, simultaneously, photos of different sizes. Furthermore, the invention can be used as a toy of normal wooden blocks connected in series to arrange any shapes by means of the elongated openings at the edges. In conclusion, the invention is a unique design and structure that is particularly useful for the purposes of displaying photos and can serve as a toy of wooden blocks that can be connected together.

I claim:

1. A type of photo clamp joint consisting of two identical pieces, featuring elongated openings on the four edges of each arm of a cross-shape piece, and a central recess at the middle of the upper surface, and several semi-spherical protrusions in a crosswise pattern on the lower surface, and a crossed pattern of elongated protrusion edges and elongated housing grooves to join a first piece with opposing elongated housing protrusion edges and the elongated grooves of a second piece.

2. A photo clamp joint consisting essentially of a first planar piece and a second planar piece, each planar piece having:

(1) semi-spherical protrusions raised within a plane of each planar piece, each planar piece having in its center a central recess oriented within each of said planar pieces;

(2) a bottom surface, said bottom surface having at least one raised elongated housing groove and at least one elongated protrusion said raised elongated housing groove of a first planar piece being adapted to removably receive and retain said elongated protrusion of a second piece whereby said semi-spherical protrusions of said first planar piece are aligned and paired in juxtaposition with said semi-spherical protrusions of said second planar piece such that a pair of said semi-spherical protrusions removably hold a corner of a photo.

3. The photo clamp joint of claim 2 wherein a pattern of four crossed semi-spherical protrusions are raised within said plane of each planar piece.

4. The photo clamp joint of claim 2 wherein said bottom surface has a plurality of elongated protrusions.

5. The photo clamp joint of claim 4 wherein two radially opposing raised elongated housing grooves are crossed with two radially opposing elongated protrusions.

* * * * *